March 7, 1967  CARL-ERIK GRANQVIST  3,307,411
ARRANGEMENT IN SPRING LOADED GYROSCOPES FOR INERTIA NAVIGATION
Filed Nov. 1, 1962  3 Sheets-Sheet 1

INVENTOR
CARL-ERIK GRANQVIST

BY *Larson and Taylor*

ATTORNEYS

United States Patent Office 3,307,411
Patented Mar. 7, 1967

3,307,411
ARRANGEMENT IN SPRING LOADED GYRO-
SCOPES FOR INERTIA NAVIGATION
Carl-Erik Granqvist, Lidingo, Sweden, assignor to AGA
Aktiebolag, a corporation of Sweden
Filed Nov. 1, 1962, Ser. No. 234,828
Claims priority, application Sweden, Dec. 12, 1961,
12,412/61
8 Claims. (Cl. 74—5)

In an earlier patent application No. 86,975 the same inventor has proposed an arrangement for obtaining a fixed direction in space or a constant predetermined rotation in space by means of a gyroscope suspended in inner and outer gimbals wherein the first or inner gimbal is subjected to a permanent deflecting load which thereby causes the second or outer gimbal to precess. This arrangement comprises pick-up means on the second gimbal to sense rotary deflection of the first gimbal by secondary precession from the second gimbal due to frictional forces in its bearings or similar forces, and in response thereto to control a torque motor through amplifying means for applying appropriate torque to the second gimbal contrary to said secondary precession to keep the first gimbal in its former position.

In practice the most appropriate arrangement of this kind consists of a spring, provided between the two gimbals for executing said resilient, counteracting force. The present invention relates to characteristics of said spring and is based upon an investigation about the circumstances, which determine the accuracy in an arrangement of the above kind.

According to the invention, the spring characteristic is such that the derivative of the torque from the torque motor in respect to an angle measured on the one side between the axis of the gyroscope rotor and on the other side the axis of the outer gimbal, which is provided to be rotatable by said motor, is essentially equal to the derivative of the precession moment in respect to the same angle.

Figure 1:
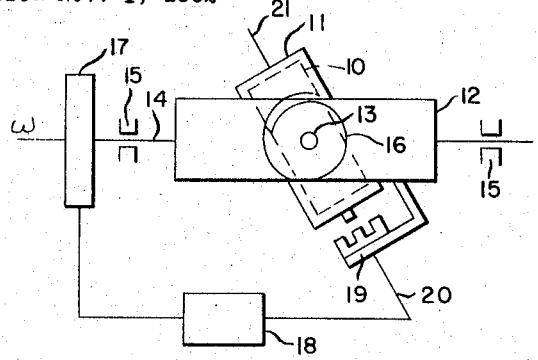
Figure 2:
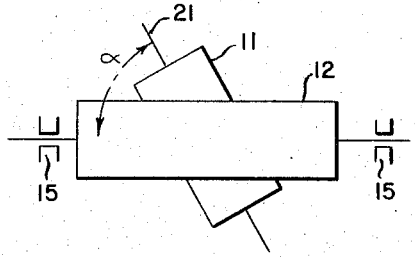

The invention will be further described below in connection with the attached drawings, in which FIG. 1 shows a schematic diagram of an arrangement according to the invention, and FIG. 2 shows a simplified schematic diagram in which some of the details of FIG. 1 have been omitted. FIGS. 3, 4, 5 and 6 show curves for explaining the function of the invention, and FIGS. 7–12 show different arrangements of the springs, according to the present invention. In connection with this description further details of the invention will also be clarified.

In FIG. 1 the inner gimbal which in its interior carries the gyro rotor 10, is indicated by 11. The gyroscopic rotor is provided in such a way within the gimbal that it cannot be seen, and it has therefore only been shown by dotted lines. The inner gimbal 11 is rotatably mounted in the outer gimbal 12 by means of a shaft 13, running perpendicularly to the level of the paper, the geometrical axis of which being indicated as the α-axis from reasons which will be evident from the following. The outer gimbal 12 is rotatably mounted in further means by means of a second shaft 14, which means preferably consist in the frame 15 of the device. The shaft 14 will also be designated as the ω-axis from reasons, which will be evident from the following. A spring 16 is arranged so as to execute a rotary moment on the axis 13 relative to the outer gimbal 12. A motor, which is provided to produce a torque on the ω-axis, is designated 17. The torque of the moment motor 17 will therefore counteract any frictional or similar forces which would otherwise by secondary precession influence the tension of the spring 16 and consequently put the inner gimbal 11 in motion due to said secondary precession force from the outer gimbal 12 to the inner gimbal 11.

The torque motor 17 is fed with current from an amplifier 18, the output voltage of which is controlled by means of a collector 19, which may consist of an armature connected to the inner gimbal, as shown in FIG. 1, said armature being displaced at any movement of said gimbal past the three poles of an alternating-current fed magnet with E-core, designated 19 and connected to the outer gimbal 12. This arrangement is known per se and will therefore require no further explanation in this connection. The action of this arrangement is briefly the following:

The middle leg of the E-magnet may be fed with a primary alternating voltage.

In symmetrical position of the armature on the inner gimbal 11 relative to the E-magnet on the outer gimbal 12 equally strong fields are closed through the two magnetic circuits formed through each of the outer legs of the magnet 19 and re-closed through the middle leg. Secondary windings applied on said legs are counter-coupled and the resulting voltage will be zero. When a displacement of the armature takes place in one direction or the other, one of the secondary windings will get a stronger voltage, and the resulting secondary voltage will either be in phase or in counterphase to the primary voltage, dependent upon the direction of the displacement of the armature. The secondary voltage is fed by means of an electrical conduit 20 to the amplifier where it is modulated with the primary voltage in a manner known per se. It is thereafter rectified so that a voltage will be fed to the torque motor 17 for creating a moment in one direction or the other, dependent upon the direction of displacement of the armature in relation to the E-magnet of the sensing device and so that balance is restored in a given position of the inner gimbal. It should be mentioned that as the precession force could as well be transferred from the inner gimbal to the outer one as from the outer gimbal to the inner one, it is immaterial to the invention if the spring acts on the inner gimbal and the torque motor 17 on the outer gimbal, or if the relation is the opposite, i.e. if the spring 16 influences the outer gimbal 12 and the torque motor 17 influences the inner gimbal. The reason why one prefers the arrangement shown in FIG. 1 exclusively is that the torque motor is so heavy that one prefers not to load the outer gimbal with this motor in order to produce a torque on the shaft 13 of the inner gimbal 11 but one prefers to load the base frame with the torque motor 17 for influencing the shaft 14 of the outer gimbal.

It will, however, be evident from the above that if the torque motor 17 causes a turning of the ω-axis with an angular amount of ω this may be the exact amount to compensate for the friction in the bearings 15 of the base frame. But if it is not, a torque by secondary precession will be produced on the α-axis and this axis will move with an angular amount α due to secondary precession. If the spring 16 maintains the angle between the shafts 14 and 21=α₀ in its rest position and if there is a further displacement of this angle by a value=α, to cause the primary precession one will consequently get the following equation for the state of equilibrium during rotation of the gyro about the axis of the shaft 14:

$$(\alpha + \alpha_0) \sim I_0 \cdot \omega_0 \cdot \omega \cdot \sin \alpha \tag{1}$$

In the above equation $I_0$ designates the moment of inertia of the gyro motor, $\omega_0$ is the normal starting angle of the shaft 14 and is the angle which is superimposed thereon due to the combined action of the precession and the torque motor 17 which is under influence of the voltage from the amplifier 18.

FIG. 2 shows the basic relations for the function of the arrangement according to FIG. 1, whereby, however, the sensing device 19 as well as the amplifier 18 and the torque motor 17 have been omitted. It is further assumed that the arrangement according to FIG. 2 works without any friction so that there are no power losses which need to be compensated for by additional power from the torque motor. The arrangement according to FIG. 2, under these circumstances which are thus not existing in practice, would work according to the law which has been indicated by Equation 1 above. As losses of power cannot be avoided in bearings and the like, however, there is provided a so-called circulatory servo circuit with addition of power in the amplifier 18. This power is transferred from the amplifier to the torque motor 17 and by means of the shaft 14 to the outer gimbal 12 and by precession to the inner gimbal 11, which by its movement will give an indication of the magnitude of the power. This movement is measured by means of the sensing device 19 and the magnitude of the movement indicated therein is re-transferred to the amplifier 18 for controlling the additional power given from said amplifier. In this way a controlled circulation of power has been established to compensate for friction losses and similar effects.

It will also be evident from the above that if one should disconnect the circulatory servo circuit, for instance by disconnecting the heating circuit to the cathode in some of the electronic tubes contained in the amplifier 18, a successive resetting of the position of the gryoscope to a state, free from precession force, would take place if no friction should exist. But as friction is present, the angle $\omega$ would successively decrease until it approaches asymptotically the value zero, and simultaneously the angle $\alpha$ would successively decrease until it asymptotically approaches the zero value. During all of this setting time, however, power is transferred from the $\alpha$-axis to the $\omega$-axis, and consequently the resetting takes place very slowly, in some cases even so imperceptibly slowly that the observer cannot with the naked eye see that a resetting movement takes place. Therefore he does not know that the gyroscope is no longer fit for use for a correct indication of the position indicating magnitudes according to the principle indicated in the preamble.

Figure 3:
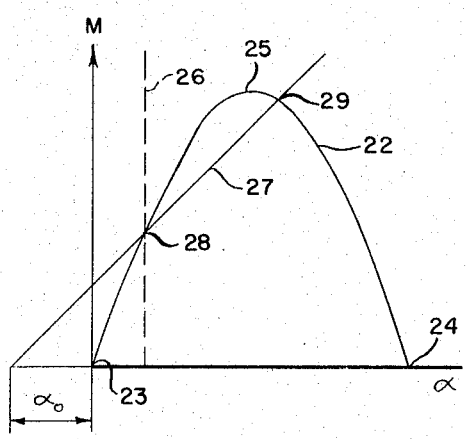

It is therefore important for several different reasons that the setting due to the precession force should take place rapidly, and this can only take place if the curve indicating the moment from the torque motor as a function of the angle $\alpha$ is very steep. This curve is shown in FIG. 3 at 22. As well known, it is formed like one half period of a sine wave. In order that one shall work at a place where this curve is steep but its moment value is not too low, one must try to find a compromise. Of course, the curve is steepest in the immediate vicinity of its foot point 23 or 24, respectively, but there the moment value is small. The moment value is biggest in the vicinity of the vertex point 25 of the curve, but there, instead, the slope is small. A rather good compromise which has proved in practical tests to produce a very favorable result, is gained if one works at a value of $\alpha=20°$ or 30°, as indicated by means of the dotted line 26. This means that the curve 27 for the variation of the resilient moment with the angle should contact (intersecting or being tangential to) the curve 25 at the point 28 of the line 26. The slope of the curve 27 of the resilient moment is given by the spring constant and one will consequently get a value for the angle $\alpha_0$, as indicated in FIG. 3, equal to the distance between the intersectional point between the horizontal axis and the line 27, on the one hand, and the origin point, on the other hand. In order to obtain stability in the system, it is further required that the derivative on the two curves 22 and 27 should both have the same pre-sign and as the derivative is always positive due to the resilient tension, one must also work in the point 28 but must not work in the point 29 on the curve for the moment of the torque motor.

We will now return to the idealized arrangement according to FIG. 2 in order to show that it does not function properly for another reason. Disturbing torque may occur, for instance in the form of friction, but there is no principal difference between a disturbing torque from a friction force and a torque which is intentionally produced between the outer and the inner gimbals 11 and 12, respectively, by means of the spring 16, as far as regards the speed, by which a movement can take place. A disturbing friction moment which cannot be avoided in the arrangement according to FIG. 2 is indicated by $M_s$. This will then be equal to:

$$M_s = I_0 \cdot \omega_0 \cdot \sin \alpha \cdot \frac{d\alpha}{dt} \quad (2)$$

If no friction existed in the bearings carrying the $\alpha$-axis, the $d\alpha/dt$ would increase so quickly that the torque about the $\omega$-axis would not be able to produce the change of the angle $\omega$ desired. If, on the other hand, the $\alpha$-axis had been locked agaist rotation, then, according to known laws, the disturbing torque $M_s$ would cause an immediate acceleration of the mass about the $\omega$-axis. In order to obtain an adjustment of the value of the rotational speed $\omega$ about the shaft 14 it is therefore necessary that one feeds a disturbing torque $M_s$, but this must under no circumstances be so strong that it causes great acceleration phenomena. The purpose of the spring 16 is to provide such a torque but it is evident from this that the resilient torque must be kept very low, which, in its turn, requires a low value of the spring constant. Such a low value of the spring constant while retaining the required rigidity of the spring, however, cannot be obtained when one works in the point 28, FIG. 3, if the spring is not made very long, or even so long that the dimensions become impractical.

It is easily seen from the above that one if faced with a difficult problem: For certain basic reasons one must work in the vicinity of the point 28, FIG. 3, but for other reasons one cannot work in the vicinity of this point without giving dimensions to the whole device, and especially the spring 16, which could not be used in practical operation. This is the problem which is solved by the present invention.

It is now seen from FIG. 3, as already mentioned above, that the precession moment will follow a sine like curve 25, whereas the resilient moment follows a curve 27 in the form of a straight line, if one can assume that the spring constant is completely constant.

Figure 4:
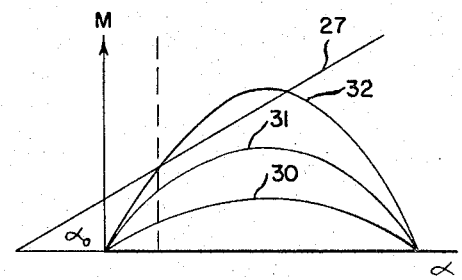
Figure 5:
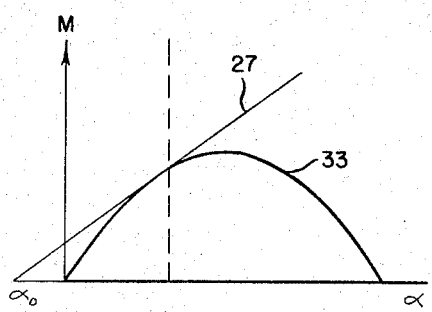
Figure 6:
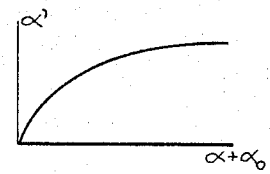

When a gyro system of this type is started, the precession moment will increase successively. Simultaneously, the counteracting resilient moment also increases along the line 27. A readjustment of the angle $\alpha$ is built up simultaneously, the sensing device 19 reacts and controls the amplifier, so that this will cause an increasing value of $\omega$. This increase in $\omega$ continues until stability or balance is achieved at the point 28. The manner in which the precession moment increases is shown in FIG. 4, where three different sine like curves 30, 31 and 32 have been shown, which, in the order now mentioned represent the successive states during the starting of the gyro system, represented by different rotational speeds of the gyro rotor. A line 27 has further been drawn in the diagram according to FIG. 4.

Investigating now closer the function of the arrangement by differentiating the Equation 1 above, the following equation is obtained.

$$d\alpha \sim \frac{I_0 \omega_0}{k}(\sin \alpha \cdot d\omega + \omega \cos \alpha \cdot d\alpha \quad (3)$$

From this equation one can easily calculate the value of $d\alpha/d\omega$:

$$\frac{d\alpha}{d\omega} \sim \frac{I_0 \omega_0}{k} \sin \alpha \frac{1}{1 - \omega \cdot \cos \alpha \frac{I_0 \omega_0}{k}} \quad (4)$$

It is seen from this equation that the sensitivity $d\alpha/d\omega$ will assume an unlimited value, provided that $$1 = \omega \cos \alpha \frac{I_0 \omega_0}{k} \quad (5)$$

This means the same as a spring factor equal to $$\cos \alpha \cdot I_0 \cdot \omega_0 \cdot \omega$$

From this it is easy to see that the most advantageous value of the spring constant is obtained if this is equal to the derivative of the precession moment in the balanced position, for instance, the position 28, FIG. 3. In other words, this means that the value of the angle $\alpha_0$ should be chosen in such a way that one works on a curve within the curves shown in FIG. 4, said curve being tangent to the line 27. This state has been shown in FIG. 5, where the curve in question of the precession moment has been shown at 33. One has thus obtained the result which was indicated above as the main point of the invention, namely that the spring 16 is so characterized that the derivative of its resilient moment with respect to an angle, measured on the one side between the shaft of the gyroscope and on the other side the shaft of the gimbal, which is arranged to rotate by means of the torque motor is substantially equal to the derivative of the precession moment with respect to the same angle.

It should be observed that in the above mentioned equations the fact that the resilient moment varies linearly, or, in other words, that the spring constant really is a constant factor, has not been decisive for the result. Consequently this result will also apply to an arrangement using some other device acting as a spring, the spring constant of which is not really constant but varies as may be the case in certain aerodynamic, resilient arrangements. The above indicated generalization that the two derivatives should be equal or at least substantially equal is therefore justified.

Inserting now the above value of the spring constant $k$ in Equation 1, one will obtain:

$$\omega \cdot \cos \alpha \cdot I_0 \omega_0 (\alpha_0 + \alpha) = I_0 \omega_0 \cdot \sin \alpha \omega \quad (6)$$

which gives:

$$\tan \alpha = \alpha_0 + \alpha \quad (7)$$

Some examples may be given: Choosing $\alpha = 45°$ or $\pi/4$, $\tan \alpha = 1$ and $\alpha + \alpha_0$ will then be equal to 1 radian or 57°. Choosing instead $\alpha = 60°$ or $\pi/3$, $\tan \alpha = \sqrt{3}$ and $\alpha + \alpha_0$ will be $= \sqrt{3}$ radians or 99°. By a simple subtraction one will obtain that in the former case $\alpha$ is $= 12°$ and in the latter case $= 39°$.

In order to respond to the setting movements which an inertia navigation gyroscope of this kind will have in practice, the spring must be capable of being strained up to about 90°. In order to make this possible one can, if one uses a usual clock spring, not make this shorter than about 180°, because otherwise it would be subjected to too great mechanical strains. Also such a dimensioning of the spring will be clumsy and inconvenient. In practice, the unsymmetrical mass of the spring which is subjected to the same acceleration as the gyroscope and its base frame, for instance an aircraft, will thereby influence the stabilization position of the gyroscope so strongly that an essential erroneous indication will be the consequence. It is therefore desirable that the spring arrangement be such that acceleration forces which may occur on the spring itself will be balanced out. Standard for such arrangements should be the criterion indicated in FIG. 6, that also during the acceleration period of the vessel, on which the gyroscope system is placed, the chosen position of equilibrium of $\alpha$, which has been indicated by $\alpha'$, should follow the variation of $\alpha + \alpha_0$ according to the curve shown in FIG. 6 which is derived from the above equations.

A number of different spring constructions which satisfy the above indicated relationship are shown in FIGS. 7–12.

Figure 7:
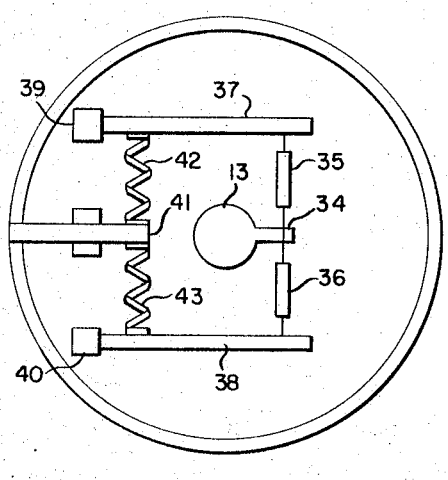

Thus, FIG. 7 shows an arrangement in which the shaft 13 is provided with a radial projection 34 acting as attachment for the spring. The projection acts by means of two links 35, 36, arms 37 and 38, respectively, pivotable about fixed axes 39 and 40, respectively. between the shaft fixtures of the two shafts, or, more exactly, about half-way between them, a spring fixture 41 is provided and between the spring fixture 41 and each of the two arms 37, 38 a spring 42, 43 is interconnected. These two springs therefore balance each other as far as their tensions counteract each other. They act in common on the extension 34 to produce a torque on the shaft 13.

Figure 8:
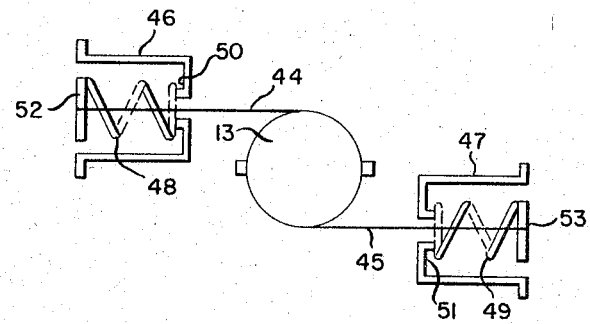
Figure 12:
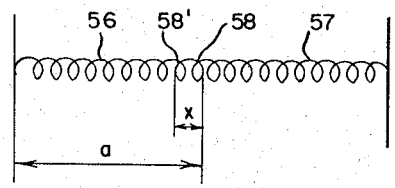

In the arrangement according to FIG. 8, two wires 44, 45 have been wound around the shaft 13 or a drum connected to the shaft, each leading to a spring casing 46, 47 in which springs 48, 49 are provided so that they rest on the one hand against the mouth flange 50, 51 of the spring casing 46, 47, and on the other hand against a plate 52, 53, rigidly connected to the wires 44, 45.

Figure 9:
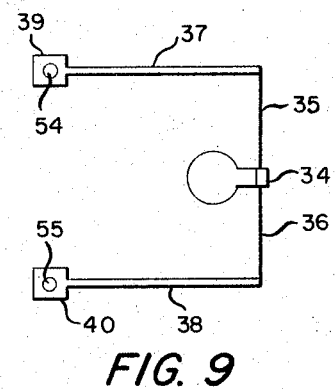
Figure 10:
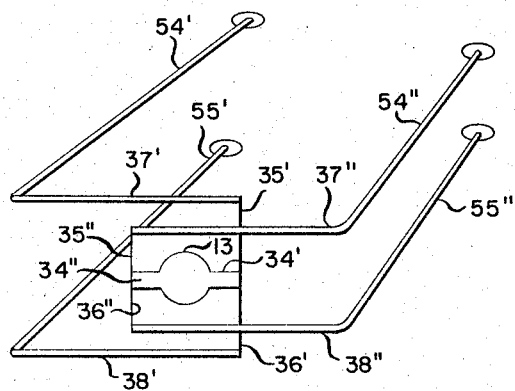
Figure 11:
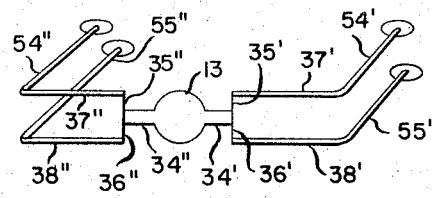

FIG. 9 shows a modification of the arrangement according to FIG. 7. In the arrangement according to FIG. 9 the heads 39 and 40 carrying the two arms 37 and 38 are in their turn carried by a couple of long torsional shafts 54, 55, running perpendicularly to the level of the paper. This arrangement may provide essentially greater balancing possibilities, if it is doubled as shown in FIG. 10 perspectively, where the different parts have been provided with a prime for the one system and with a second for the other system. FIG. 11 shows an arrangement which in principle functions according to the same rules as FIG. 10, but the two arms 37 and 38 have been turned in the opposite direction.

In all of the different constructions shown in FIGS. 7–11 two springs are provided, counteracting each other. In principle, this arrangement may be regarded in agreement with the arrangement of FIG. 12, in which the two springs are schematically indicated by 56 and 57. These springs have a normal length $a$ and they are under such a bias tension that one of them cannot be subjected to extension during the movement, caused by a step, through which the other one is subjected to pressure. If both of the springs are identically alike in the normal position and if they have the spring constant $k$, a movement of the connection 58 through a distance of $x$ from the position 58 to the position 58′ will cause that the pressure from the one spring being $k(a-x)$ and the pressure from the other spring being $k(a+x)$. The difference in pressure will therefore be $2 \cdot k \cdot x$, from which it is seen that one can in this way introduce a compensation for the length $a$ of the spring, which therefore will not cause any limitation of the pressure. The dimensioning of the springs is hereby facilitated.

It is also evident from the above that the rotational speed of the proper gyro rotor is of importance for accuracy in a gyro system of this kind. This rotational speed, however, tends to vary with temperature changes and this will, after the springs have been arranged in the above way, be the greatest source of error in the inertia navigation gyroscope. However, this disadvantage may be compensated for to a high degree. Thus, one can make the parts of the gyroscope and particularly the existing arms, for instance the arms 37 and 38 of FIG. 9 and corresponding arms of the other figures of some material which does not change its dimensions to an essential degree at temperature variations, for instance the metal alloy which is known as "Invar." If this happens, this source of error will as a matter of fact be done away with and the greatest source of error following thereafter will consist in the variations in the spring constant of the torsional springs according to FIG. 10 or 11 with temperature variations. Even this exclusively remaining error can, however, be eliminated effectively by making these torsional springs in the form of quartz bars.

The invention is of course not limited to the specific form or forms of execution which have been further described above but all kinds of different modifications may occur within the scope of the invention.

What is claimed is:

1. In a spring loaded gyroscope for inertia navigation having a first gimbal having a supporting axis and a second gimbal pivotally mounted on its supporting axis within said first gimbal, a rotor within said second gimbal whereby rotation of the rotor pivots said second gimbal within said first gimbal, means for sensing the displacement of said second gimbal with respect to said first gimbal, and a torque motor drivingly connected to pivot said first gimbal about its supporting axis in response to the displacement of said second gimbal; an arrangement for resiliently counteracting precession forces occurring on said second gimbal and comprising spring means acting upon said second gimbal to apply a torque thereto, said spring having the characteristic that the derivative of the force exerted by the spring with respect to the angle between the axis of rotation of the gyroscope rotor and the supporting axis of said first gimbal is substantially equal to the derivative of the precession moment from the spring with respect to the same angle.

2. In a spring loaded gyroscope as claimed in claim 1 wherein said rotor is of a metal alloy with compensated heat expansion.

3. In a spring loaded gyroscope as claimed in claim 1 wherein said spring means comprises two springs positioned to counteract each other.

4. In a spring loaded gyroscope as claimed in claim 3 and further comprising a pair of arms pivotally mounted on parallel axis on both sides of the pivot axis of said second gimbal, said springs acting upon each of said arms, a radial extension on the pivot axis of mid second gimbal, and links connecting said radial extension with the face ends of said arms.

5. In a spring loaded gyroscope as claimed in claim 4 wherein said arms are of a metal alloy with compensated heat expansion.

6. In a spring loaded gyroscope as claimed in claim 3 and further comprising a pair of wires attached to the periphery of said second gimbal supporting axis and extending tangentially therefrom in opposed directions, said springs being connected to said wires.

7. In a spring loaded gyroscope as claimed in claim 3 wherein said springs comprise a pair of torsion springs on opposite sides of said second gimbal supporting axis, arms mounted on said torsion springs, a radial extension on the supporting axis of said second gimbal, and links connecting said radial extension with the face ends of the said arms.

8. In a spring loaded gyroscope as claimed in claim 7 wherein said torsion springs comprise quartz torsion bars.

References Cited by the Examiner

UNITED STATES PATENTS 2,630,017   3/1953   Slater _____ 74—5.47

FOREIGN PATENTS 630,657   10/1949   Great Britain.

FRED C. MATTERN, JR., *Primary Examiner.*

DON A. WAITE, *Examiner.*

K. J. DOOD, P. W. SULLIVAN, *Assistant Examiners.*